United States Patent Office 3,651,124
Patented Mar. 21, 1972

---

3,651,124
SUBSTITUTED 2-BROMO-2-NITRO-ALKYL ESTERS OF SALICYLIC ACID
Richard Wessendorf, Essen-Heisingen, and Horst Bellinger, Dusseldorf, Germany, assignors to Henkel & Cie., GmbH, Dusseldorf-Holthausen, Germany
No Drawing. Filed Oct. 22, 1970, Ser. No. 83,235
Claims priority, application Germany, Nov. 6, 1969, P 19 55 854.4
Int. Cl. C07c 69/88
U.S. Cl. 260—474    6 Claims

ABSTRACT OF THE DISCLOSURE

Novel salicvlic acid esters of the formula

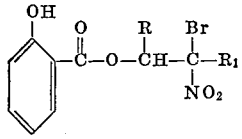

wherein R is selected from the group consisting of hydrogen, methyl and halogenated methyl and $R_1$ is selected from the group consisting of hydrogen and methyl and ethyl which may be substituted with at least one hydroxy group which have antimicrobic activity and lower toxicity than the corresponding free alcohols.

---

STATE OF THE ART

The antimicrobial activity of many salicylic acid derivatives such as 3,4′,5-tribromosalicylanilide and other halogen and trifluoromethyl substituted salicylanilides and combinations of these compounds, is known. In many cases, the said compounds possess a sufficient activity, but their spectrum of action has not been found satisfactory, since besides having a strong fungicidal action, a very good killing of gram-positive as well as gram-negative bacteria is also required at very low concentrations of the active material. Compounds are also known generally as antimicrobial substances which contain bromo and nitro groups, especially aliphatic bromonitro-alcohols, in which the bromide atom and the nitro group are attached to the same carbon atom. Besides a very high antimicrobial activity, the latter compounds such as 2-bromo-2-nitropropanediol-(1,3) or especially 1-bromo-1-nitro-3,3,3-trichloropropanol-(2), have also a very broad spectrum of action. In some cases, however, the high toxicity of the compounds becomes noticeably troublesome.

OBJECTS OF THE INVENTION

It is an object of the invention to provide the novel salicylic acid esters of Formula I.

It is another object of the invention to provide novel antimicrobic compositions having a low degree of toxicity.

It is another object of the invention to provide an improved method of killing fungi and bacteria.

These and other objects and advantages of the invention will become obvious from the following detailed description.

THE INVENTION

The novel salicylic acid esters of the invention have the formula

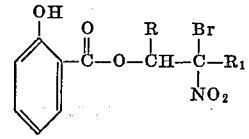

wherein R is selected from the group consisting of hydrogen, methyl and halogenated methyl and $R_1$ is selected from the group consisting of hydrogen and methyl and ethyl which may be substituted with at least one hydroxy group. The halogenated methyl group of R may have 1 to 3 halogens such as chlorine, bromine, etc. The novel esters of the invention have the advantage of low toxicity while keeping the entire antimicrobial activity of the corresponding free bromonitro alcohol and in some cases the said activity is enhanced.

Examples of suitable salicylic acid esters of the invention are 2-bromo-2-nitro-ethyl salicylate, 2-bromo-2-nitropropyl salicylate, 2-bromo-2-nitro-1-trichloromethylethyl salicylate, 2-bromo-2-nitrobutyl salicylate, 2-bromo-2-nitro-1-methyl-propyl salicylate and 2-bromo-2-nitro-3-hydroxypropyl salicylate.

The preparation of the said bromonitroalkyl esters of salicylic acid may be effected in known ways such as by reacting a bromonitro-alcohol with salicylic acid chloride in an inert organic solvent such as benzene or carbon tetrachloride. The salicylic acid chloride needed for the reaction is obtainable in 94% yield from salicylic acid and thionyl chloride by known methods. The bromonitro-alcohols to be used can be prepared as follows.

A nitroalcohol formed from a nitroalkane and an aldehyde can be converted into the sodium salt of the desired nitro-alcohol by reaction with sodium alcoholate in alcoholic solution, which salt is then reacted with bromine in an organic solvent such as ether, chloroform or carbon tetrachloride to give a bromonitroalcohol. The 1-nitro-3,3,3-trichloropropanol-(2) formed by condensation of chloral with nitromethane by the process described in the Journal Chem. Soc. (1935), p. 1178, may be reacted with sodium methylate to give the corresponding sodium salt and then brominated to 1-bromo-1-nitro-3,3,3-trichloropropanol-(2). A further possibility for the preparation of bromonitro-alcohols is to react an aldehyde, a nitroalkane and an inorganic magnesium or alkaline earth salt in the presence of water and to brominate the magnesium or alkaline earth salts of the corresponding nitroalcohols so obtained in aqueous suspension.

The novel antimicrobial compositions of the invention are comprised of an effective amount of at least one salicylic acid ester of Formula I and a major amount of an inert carrier. Preferably, the compositions contain 0.05 to 5% especially 0.1 to 1%, by weight of the total composition of the said esters. The compositions may be in the form of liquid, pasty or solid composition form, such as for example, aqueous suspensions, emulsions, solutions in organic solvents or oils, ointments, creams, pencils or powders, which may be used as cleaning preparations generally and specific skin-care preparations and other cosmetic preparations.

The novel method of killing fungi and bacteria comprises contacting fungi and/or bacteria with a lethal amount of at least one salicylic acid ester of Formula I.

In the following examples there are described several preferred embodiments to illustrate the invention. However, it is to be understood that the invention is not intended to be limited to the specific embodiments.

EXAMPLE I

Preparation of 2-bromo-2-nitrobutyl salicylate 99 g. of 2-bromo-2-nitrobutanol-(1) were dissolved in 150 cc. of benzene and after the addition of 78 g. of salicylic acid chloride, the mixture refluxed for 4 hours. The residue remaining after evaporation of the benzene was fractionally distilled in vacuo to obtain 131 g. (82.5% yield) of 2-bromo-2-nitrobutyl salicylate having a boiling point of 139° at 0.01 mm. Hg and a refractive index $n_D^{20} = 1.5499$.

EXAMPLE II

Using the procedure of Example I, 2-bromo-2-nitropropanol-(1) was reacted with salicylic acid chloride to obtain 2-bromo-2-nitropropyl salicylate.

EXAMPLE III

Using the procedure of Example I, 2-bromo-2-nitropropanediol-(1,3) was reacted with salicylic acid chloride to obtain 2-bromo-2-nitro-3-hydroxypropyl salicylate.

EXAMPLE IV

Using the procedure of Example I, 1-bromo-1-nitro-3,3,3-trichloropropanol-(2) was reacted with salicylic acid chloride to obtain 2-bromo-2-nitro-1-trichloromethyl ethyl salicylate.

EXAMPLE V

Using the procedure of Example I, 2-bromo-2-nitrobutanol-(1) was reacted with salicylic acid chloride to obtain 2-bromo-2-nitrobutyl salicylate.

EXAMPLE VI

Using the procedure of Example I, 3-bromo-3-nitrobutanol-(2) was reacted with salicylic acid chloride to obtain 2-bromo-2-nitro-1-methyl-propyl salicylate.

EXAMPLE VII

To demonstrate the advantage of the salicylate esters of Formula I as compared with the prior art salicylate and the corresponding free bromonitro alcohol, the activity of 2-bromo-2-nitrobutyl salicylate (compound A) was compared with 2-nitro-butyl salicylate (compound B) and 2-bromo-2-nitro-butanol-(1) (compound C).

The inhibiting concentrations of the compounds examined were determined by the so-called plate test. This test is a modified form of the dilution test for the estimation of the microbiostatic action described under the methods for the preliminary examination of such materials in the Instructions for the testing of chemical disinfectants of the Deutschen Gesellschaft für Hygiene and Mikrobiologie, and can be advantageously used in various tests instead of the use of liquid culture media indicated therein. The advantage of solid culture media obviously lies especially in tests of the activity of substances towards fungi.

The desired test concentrations were prepared by mixing specific amount of the substance solutions of suitable concentrations with specific amounts of liquid bouillon or beer wort-agars, in sterile petri-dishes. The amounts, measured with a pipette, of the substance solutions were a maximum of 0.1 to 1 ml. and the total volume in the petri-dishes after admixing with the culture media amounted to 10 ml. After solidification of the culture media, its surface was inoculated with the test germ suspension in bouillon or wort, which contained about $10^8$ germs per ml. The incubation took place at 37° C. or at 30° C. in the incubator, and lasted 8 days when bacteria or Candida albicans were employed. When epidermophyton Kaufmann-Wolf were used, it lasted 21 days. The duration of incubation of 21 days for epidermophyton Kaulmann-Wolf was chosen to conform to the above standard test, because in the evaluation of disinfectants against fungi of the epithelium a substance is considered as suitable when the growth of the fungi after predetermined duration of action is delayed by at least 21 days. Therefore, it was ascertained which of the substance concentrations worked into the culture media was just about capable to arrest the growth of the test germs completely. This value thus ascertained was indicated as threshold concentration. The tests were carried out in the following concentration intervals: 10,000, 5,000, 2,500, 1,000, 750, 500, 250, 100, 50, 25, 10, 5, 2,5, 1, 0.5, 0.25 and 0.1 p.p.m.

The test organisms used in the plate test were

1 = *Staphylococcus aureus*
2 = *Escherichia coli*
3 = *Pseudomonas aeruginosa*
4 = *Candida albicans*
5 = *Epidermophyton Kaufmann-Wolf*
6 = *Aspergillus niger*

In the plate test the inhibiting concentrations given in Table I were found.

In addition, varying amounts of the three test compounds were administered to groups of mice in order to determine $LD_{50}$ dose in gm./kg. and these values are reported in the last column of Table I.

TABLE I.—INHIBITING CONCENTRATIONS IN P.P.M.

| Test organism | 1 | 2 | 3 | 4 | 5 | 6 | $LD_{50}$ g./kg. (mouse) |
|---|---|---|---|---|---|---|---|
| Substance: | | | | | | | |
| A | 50 | 50 | 50 | 50 | 1 | 1 | 2.80 |
| B | >10,000 | >10,000 | >10,000 | >10,000 | 100 | >10,000 | |
| C | 100 | 100 | 1,000 | 1,000 | 10 | 100 | 0.158 |

The results reported in Table I show that compound A of the invention has an activity 100 to 200 times greater than the corresponding salicylate ester B of the prior art and is 10 to 20 times more active than the free bromonitro alcohol C while being more than 15 times less toxic to mice resulting in a much greater range of safety.

COMPOSITION EXAMPLES (A) Antimicrobial solution

| | Parts by weight |
|---|---|
| 2-bromo-2-nitrobutyl salicylate | 0.25 |
| Spiritus dil. | to 50 |

(B) Antimicrobial ointments

| | Parts by weight |
|---|---|
| (1) 2-bromo-2-nitropropyl salicylate | 1 |
| Vaseline alba | to 100 |
| (2) 2 - bromo - 2 - nitro - 1-trichloromethyl-ethyl salicylate | 1 |
| Ungentum alcohol lanae | to 100 |
| (3) 2-bromo-2-nitro-3-hydroxypropyl salicylate | 1 |
| Polyethylene glycol 300 and polyethyleneglycol 1500 1:1 | to 100 |
| (4) 2-bromo-2-nitropropyl salicylate | 1 |
| Decyl oleate | 16 |
| Colloidally dispersed mixture of 90 parts of $C_{16}$ to $C_{18}$ alcohol and 10 parts of sodium $C_{16}$–$C_{18}$ alcohol sulfate | 24 |
| Water | 60 |

(C) Antimicrobial powder

| | Parts by weight |
|---|---|
| 2-bromo-2-nitrobutyl salicylate | 1 |
| Talcum venet | to 100 |

(D) Clear antiseptic shampoo

| | Parts by weight |
|---|---|
| 2-bromo-2-nitropropyl salicylate | 3 |
| Sodium lauryl ether sulfate (27–28% WAS) | 40 |
| Coconut fatty acid diethanolamide | 6 |
| Water | 51 |

(E) Deodorant spray

| | Parts by weight |
|---|---|
| 2-octyldodecanol | 10 |
| 2-bromo-2-nitrobutyl salicylate | 2 |
| Perfume | 1 |
| Ethanol | 87 |
| Propellant gas | 100 |

(F) Deodorant pencil

| | Parts by weight |
|---|---|
| Stearyl alcohol | 10 |
| 2-octyldodecanol | 10 |
| Coconut fatty acid monoethanolamide | 10 |
| Stearic acid monoethanolamide | 15 |
| Carnauba wax | 2 |
| Paraffin 72° C. | 11 |
| Perfume oil | 2 |
| 1,2-propylene glycol | 38 |
| 2-bromo-2-nitrobutyl salicylate | 2 |

(G) Disinfectant hand washing paste

| | Parts by weight |
|---|---|
| Sodium lauryl sulfate | 52 |
| Coconut fatty acid monoethanolamide | 3 |
| Finely ground pumice | 42 |
| 2-bromo-2-nitrobutyl salicylate | 3 |

(H) Antimicrobial fine washing composition

| | Parts by weight |
|---|---|
| Dodecylbenzenesulphonate | 30 |
| Toluenesulfonate | 2 |
| Sodium coconut fatty alcohol sulfate | 8 |
| Sodium sulfate | 30 |
| Sodium carboxymethylcellulose | 1 |
| 2-bromo-2-nitrobutyl salicylate | 3 |
| Water | 26 |

(I) Foam bath

| | Parts by weight |
|---|---|
| 2-bromo-2-nitrobutyl salicylate | 0.5 |
| Sodium lauryl ether sulfate (27–28% WAS) | 70.0 |
| Coconut fatty acid diethanolamide | 5.0 |
| Water | 25.0 |

Various modifications of the compositions and method of the invention may be made without departing from the spirit or scope thereof and it is to be understood that the invention is intended to be limited only as defined in the appended claims.

We claim:

1. A salicylic acid ester of the formula

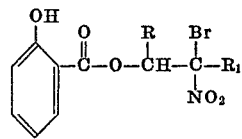

wherein R is selected from the group consisting of hydrogen, methyl and halogenated methyl and $R_1$ is selected from the group consisting of hydrogen and methyl and ethyl which may be substituted with at least one hydroxy group.

2. A compound of claim 1 which is 2-bromo-2-nitroethyl salicylate.

3. A compound of claim 1 which is 2-bromo-2-nitropropyl salicylate.

4. A compound of claim 1 which is 2-bromo-2-nitro-1-trichloromethyl-ethyl salicylate.

5. A compound of claim 1 which is 2-bromo-2-nitrobutyl salicylate.

6. A compound of claim 1 which is 2-bromo-2-nitro-3-hydroxy-propyl salicylate.

References Cited

Coleman et al., Chem. Abst., 38 2967.

LORRAINE H. WEINBERGER, Primary Examiner

J. F. TERAPANE, Assistant Examiner

U.S. Cl. X.R.

260—638, 633; 424—308